Patented June 5, 1945

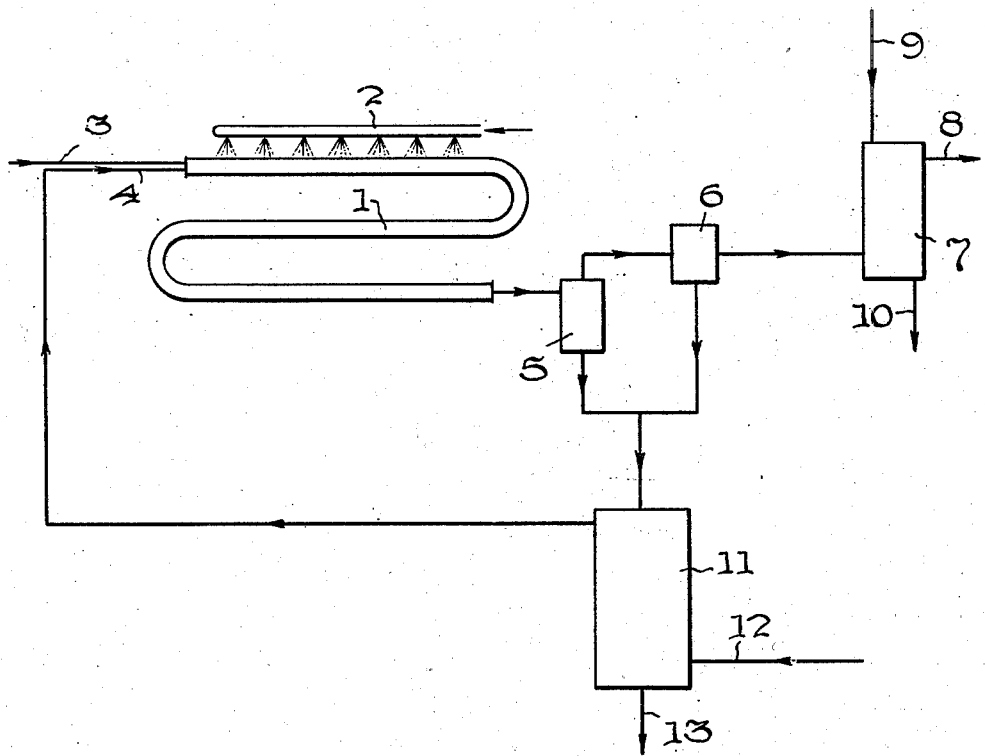

2,377,642

UNITED STATES PATENT OFFICE 2,377,642

MANUFACTURE OF CHLOROSULPHONIC ACID

Ronald Barron Mooney, Liverpool, and Godfrey Edward Wentworth, Runcorn, England, assignors to Imperial Chemical Industries Limited, a corporation of Great Britain Application September 14, 1943, Serial No. 502,346
In Great Britain October 2, 1942

6 Claims. (Cl. 23—139)

This invention relates to improvements in the manufacture of chlorosulphonic acid.

It is known that chlorosulphonic acid can be prepared by mixing sulphur trioxide-containing gases with hydrochloric acid-containing gases with cooling, and it has been deemed advantageous to keep the temperature at about 70° C., certainly not above 100° C., to prevent the formation of pyrosulphuryl chloride. In technical practice it is not easy to maintain the proportion of sulphur trioxide to hydrochloric acid in the gases precisely at the value required by stoichiometric considerations, and thus an excess of one or other reactant is usually present. Excess of hydrochloric acid is undesirable since it is difficult to recover the excess subsequently from the waste gases by an economically sound procedure. On the other hand, although excess sulphur trioxide in the waste gases can readily be recovered in an economically valuable form by contacting the gases with sulphuric acid of a suitable strength, sulphur trioxide is readily soluble in chlorosulphonic acid, and thus in the processes used hitherto in which this reactant has been in excess the product contained sulphur trioxide as impurity in substantial amounts varying with the amount of the excess.

According to the present invention we provide a continuous process for the manufacture of chlorosulphonic acid which comprises causing a stream of hydrochloric acid-containing gases and a stream of sulphur trioxide-containing gases to intermingle in such proportions that the sulphur trioxide is in excess, and under such conditions that chorosulphonic acid formed thereby condenses, separating the condensate from the mixed reaction gases, and subsequently contacting the said condensate with the said stream of hydrochloric acid-containing gases. Advantageously the mixed reaction gases, after separation of the liquid chlorosulphonic acid, are treated to recover chlorosulphonic acid remaining as mist and are then contacted with sulphuric acid of between 95% and 98% strength to recover sulphur trioxide values.

By this means the chlorosulphonic acid is produced from a gaseous reaction mixture in which the sulphur trioxide is in excess, and thus from which the excess reactant can be recovered economically. Nevertheless the product contains at most small amounts of dissolved sulphur trioxide, for after separation from the gas phase it is contacted with hydrochloric acid-containing gases which convert dissolved sulphur trioxide to chlorosulphonic acid, but which do not introduce hydrochloric acid as an impurity since the hydrochloric acid is not appreciably soluble in it.

The gases used for the reaction should be dry, and may be obtained in any suitable manner. In the case of the sulphur-trioxide-containing gases for instance, the $SO_3$ content may be between 2% and 95% and they may be obtained by passing hot air into high strength oleum, or more conveniently by the catalytic oxidation of sulphur dioxide-containing gases obtained by burning sulphur, or by roasting sulphide ores with excess air.

The hydrochloric acid-containing gases may for instance be gases containing between 15% and 95% HCl, and they may be such gases as are obtained in the salt-cake process. Suitable gases may also be obtained by heating concentrated aqueous hydrochloric acid, or from any other process in which hydrochloric acid gas is produced.

In one form of our invention an extended reaction space provided with cooling means is employed, for example, a vertical bank of horizontal tubes in series which can be sprayed externally with cold water. Preferably the diameter of the tubes is such that the gases travel along them with turbulent flow. The reaction gases can be delivered to the upper end of the bank of tubes, while from the other end liquid chlorosulphonic acid can be drawn off and delivered to the upper part of a packed tower. The sulphur-trioxide-containing gases can be delivered directly to the reaction tubes, while the hydrochloric acid-containing gases pass first to the lower part of the tower down which the crude product is passing, and from the upper part of the tower to the reaction tube. The waste gases, after removal of the crude product, can be passed first through a suitable scrubbing device, e. g., a Calder-Fox scrubber, to remove any chlorosulphonic acid present as mist, and then to the lower part of a tower down which sulphuric acid of a suitable concentration is passing. Gases leaving the upper part of the tower are of substantially no economic value, but before dicharging them to atmosphere it is preferable to wash them to remove all traces of hydrochloric acid generated by the decomposition of chlorosulphonic acid vapour carried into the vitriol tower.

With this arrangement of apparatus, the hydrochloric acid-containing gases and sulphur trioxide-containing gases are delivered to the reaction space with the latter in excess and suitably at a temperature not greatly different from atmospheric, for example at a temperature between 20° C. and 40° C. The formation of chlorosulphonic acid proceeds spontaneously with evolution of heat, but the temperature should be prevented from rising much above 110° C. and preferably it is maintained at about 90° C. Under these conditions the reaction will go substantially to completion, and by far the greater part of the chlorosulphonic acid will condense to give the crude liquid product containing dissolved sulphur trioxide, while a little will remain suspended as a mist in the waste gases consisting of inert gases, excess sulphur trioxide, and a small amount of chlorosulphonic acid vapour corresponding to the vapour pressure of the acid at the existing temperature. The crude liquid product is separated from the gases and passed down the packed tower in counter-current to fresh hydochloric acid-containing gases so that dissolved sulphur trioxide is converted to chlorosulphonic acid, and the product thus treated is withdrawn from the base of the tower as chlorosulphonic acid of high purity. The gases from which the liquid product has been removed are passed through the scrubber to remove the mist, the condensate so obtained being added to the bulk of crude product, and the gases then pass up the vitriol tower in counter-current to sulphuric acid containing between 95% and 98% of H2SO4. In contact with such acid both the sulphur trioxide and the chlorosulphonic acid vapour are absorbed, and the latter is hydrolysed to sulphur trioxide which remains dissolved, and hydrochloric acid which passes back into the gas phase and can be subsequently removed by washing the gases with water. Thus both the excess sulphur trioxide in the waste gases and that carried to the vitriol tower as chlorosulphonic acid vapour are recovered as high strength sulphuric acid, only a small amount of hydrochloric acid gas being wasted. It will be appreciated that these small amounts, corresponding to the chlorosulphonic acid vapour carried into the vitriol tower, are very much smaller than would be present in the gases if the process were conducted using an excess of that gas to prevent the formation of a crude product containing dissolved sulphur trioxide. The removal of mist from the gases before delivering them to the vitriol tower not only increases the yield of acid, but considerably diminishes the size of vitriol tower needed for a plant of a given output, and greatly facilitates its smooth operation.

The invention will now be described with reference to the accompanying drawing which illustrates diagrammatically one method of carrying out our invention.

In the drawing, which is not to scale, 1 represents a sinuous elongated reaction vessel formed of a vertical bank of horizontal pipes, (three pipes are shown) and joined together in series. By means of spray 2 water can be sprayed on to the top pipe and allowed to flow down over the remaining pipes in succession. Sulphur trioxide-containing gases can be delivered to the uppermost pipe at 3, and hydrochloric acid-containing gases at 4, while reaction products can leave the bottom pipe and flow to gravity separator 5. The pipes constituting vessel 1 are not packed, but are of such a diameter that the mixed gases pass through with turbulent flow. From the separator 5 gases pass through a dry scrubber 6, suitably of the Calder-Fox type, and thence pass to the lower part of a packed tower 7 to which sulphuric acid of 95%–98% strength can be supplied at 9 and withdrawn at 10. The gases thus flow through the tower in contact with and counter-current to the acid, and leave the system at 8.

The liquid from the separator 5, together with the comparatively small amount of liquid removed from the scrubber 6, is delivered to the upper part of packed tower 11. Hydrochloric acid-containing gases are fed into the lower part of the tower at 12 and pass from the upper part of the tower to the inlet 4 of reaction vessel 1. The liquid fed to tower 11 thus passes down the tower counter-current to, and in contact with, the hydrochloric acid-containing gases, and leaves the tower at 13.

When the process is in operation, hydrochloric acid-containing gases are fed to the system at 12, and after passing through tower 11 pass to the reaction vessel 1 by inlet 4. Sulphur trioxide-containing gases are also delivered to vessel 1 in such amount that the mixed gases entering the latter contain an excess, suitably in excess of between 3 mol. % and 15 mol. %, of sulphur trioxide over hydrogen chloride. The gases pass through vessel 1 in turbulent flow, and reaction occurs spontaneously with evolution of heat which is removed, at least in part, by the water from sprays 2, so that liquid chlorosulphonic acid is formed. By the time the lower end of vessel 1 is reached reaction will be substantially complete, and the liquid, together with excess sulphur trioxide, some chlorosulphonic acid vapour, and inert gases present in the gases fed to vessel 1, pass to the separator 5 in which the liquid chlorosulphonic acid is allowed to separate from the gases. The latter pass to dry scrubber 6 where chlorosulphonic acid mist is removed, and thence to tower 7 where they flow countercurrent to the sulphuric acid supplied at 9. The excess sulphur trioxide is absorbed by the acid and the small amount of chlorosulphonic acid vapour present is dissolved and decomposed by it, with formation of sulphur trioxide which is retained by the sulphuric acid, and hydrochloric acid which passes out of the system at 8 together with the inert gases.

The condensate obtained in separator 5, constituting the make of crude chlorosulphonic acid, is withdrawn from the lower part of the separator 5, and together with the relatively small amount of mist from scrubber 6, passes into the upper part of packed tower 11 to the lower part of which the hydrochloric acid-containing gases are fed at 12. The crude condensate thus passes down the tower in countercurrent to the hydrochloric acid-containing gases so that sulphur trioxide dissolved therein is converted to chlorosulphonic acid and the product is thus rendered almost free of the impurity. The purified product thus leaves the tower at 13, while the hydrochloric acid-containing gases leave the upper part of the tower and pass to the inlet 4 of the reaction vessel 1.

If desired, separator 5 may be omitted, the liquid product being tapped off from the lowest point of the vessel 1, and the gases from the upper side of the lowest turn of the vessel.

We claim:

1. A continuous process for the manufacture of chlorosulphonic acid which comprises causing a stream of hydrochloric acid-containing gases and a stream of sulphur trioxide-containing gases to intermingle in such proportions that the sulphur trioxide is in excess, and under such conditions that chlorosulphonic acid formed thereby condenses, separating the condensate from the mixed reaction gases, and subsequently contacting the said condensate with the said stream of hydrochloric acid-containing gases before it is mixed with said stream of sulphur trioxide-containing gas.

2. A continuous process for the manufacture of chlorosulphonic acid which comprises causing a stream of hydrochloric acid-containing gases and a stream of sulphur trioxide-containing gases to intermingle at a temperature below 110° C. in such proportions that the sulphur trioxide is in excess, separating the resulting condensate of chlorosulphonic acid from the mixed reaction gases, and subsequently contacting the said condensate with the said stream of hydrochloric acid-containing gases before it is mixed with said stream of sulphur trioxide-containing gas.

3. A continuous process for the manufacture of chlorosulphonic acid which comprises causing a stream of hydrochloric acid-containing gases and a stream of sulphur trioxide-containing gases to intermingle at a temperature between 20° C. and 40° C. and in such proportions that the sulphur trioxide is in excess, cooling the mixed gases so that the temperature does not rise to above 110° C. separating the resultant condensate of chlorosulphonic acid from the mixed reaction gases, and subsequently contacting the said condensate with the said stream of hydrochloric acid-containing gases before it is mixed with said stream of sulphur trioxide-containing gas.

4. A process according to claim 2 in which the mixed reaction gases, after separation of the said condensate, are treated in a dry scrubber to remove chlorosulphonic acid mist, and are then contacted with sulphuric acid of between 95% and 98% strength.

5. A process according to claim 3 in which the mixed reaction gases, after separation of the said condensate, are treated in a dry scrubber to remove chlorosulphonic acid mist, and are then contacted with sulphuric acid of between 95% and 98% strength.

6. In a continuous process for the manufacture of chlorosulphonic acid by causing a stream of hydrochloric acid-containing gases and a stream of sulphur trioxide-containing gases to intermingle in such proportion that the sulphur trioxide is in excess, the step of contacting liquid chlorosulphonic acid produced with the said stream of hydrochloric acid-containing gases before causing the latter to mingle with the said sulphur trioxide-containing gases.

RONALD E. MOONEY.
GODFREY E. WENTWORTH.